United States Patent [19]

Cicatelli

[11] 3,997,918
[45] Dec. 14, 1976

[54] TAPE RECORDING AND PLAYBACK APPARATUS OF THE CASSETTE TYPE

[76] Inventor: Rodolfo Cicatelli, Gandria-Lugano, Switzerland

[22] Filed: Feb. 11, 1975

[21] Appl. No.: 549,087

[30] Foreign Application Priority Data

Feb. 11, 1974 Italy .............................. 48273/74

[52] U.S. Cl. ...................... 360/137; 242/55.19 A
[51] Int. Cl.$^2$ .................. G11B 15/60; B65H 17/48
[58] Field of Search ............ 242/55.19 A; 360/137, 360/85

[56] References Cited

UNITED STATES PATENTS

| 2,631,035 | 3/1953 | Eddy ........................ 242/55.19 A |
|---|---|---|
| 3,601,557 | 8/1971 | Lennox ........................ 360/137 |
| 3,642,288 | 2/1972 | Camras ........................ 360/137 |
| 3,764,757 | 10/1973 | Inaga ........................ 242/55.19 A |

*Primary Examiner*—Daryl W. Cook
*Attorney, Agent, or Firm*—Finnegan, Henderson, Farabow & Garrett

[57] ABSTRACT

Disclosed is apparatus for receiving and enabling translatory motion of a tape cassette including first and second guides carried by the tape recording and/or playback device pivotable about mutually perpendicular axes parallel to the plane of the cassette and engageable with the cassette along its opposite sides. One of the guides is biased toward the cassette and the other guide whereby the cassette may be translated in planes parallel one to the other against the bias of such one guide with the other guide following the movement of the cassette.

9 Claims, 4 Drawing Figures

TAPE RECORDING AND PLAYBACK APPARATUS OF THE CASSETTE TYPE

Magnetic tape playback the recording apparatus presently utilize cassettes that are plugged in the front or side of a tape recording and playback system. These cassettes are conventionally provided with one or two capstans for dragging the tape and with one or two pinions for winding the tape.

Oftentimes the cassette is plugged into a room, housing or cavity that swings or slopes down. In other embodiments, the cassette is plugged into a stationary room, housing or cavity and the dragging elements swing or rise for engagement with the cassette. This last solution has the disadvantage of moving elements which have a great mass.

All the aforementioned solutions have many disadvantages, the most important of which is the requirement for considerable room or space. Thus it is difficult to obtain recording and playback apparatus compact and flat in size and configuration.

According to the present invention, the cassette is displaced or translated in a direction normal to its plane and without swinging motion.

In accordance with the invention, the cassette is guided, at least, by two orthogonal or mutually perpendicular guides, that, in connection with the need to displace the cassette in a direction normal to its plane and without lateral translation, lie one over the other on opposite sides of the cassette when inserted into the room, housing or cavity.

In accordance with another aspect of the present invention, the two guides for the cassette have their edges turned in the direction in which the cassette is plugged in and these edges are so rounded off to avoid hinderance when the cassette is plugged in or inserted.

In a preferred embodiment hereof, there are provided two guides under and one guide over the initial plane of the room, housng or cavity which initially receives the cassette. The two guides under such translation plane are characterized by cross-pieces mounted for swinging movement about axes preferably parallel one to the other and lying in the same geometrical plane parallel to the translational plane. The guide over the translational plane is preferably mounted for swinging movement about an axis that is orthagonal or normal to the aforementioned axes of the two guides but also parallel to the translational plane.

It will be appreciated that in the present specification the words "over" and "under" are used in relation to a horizontal position of the cassetta and, of course, such terms are not limiting in the use of the present invention since the cassette can be plugged or inserted in slanting plane in comparison with a horizontal plane. The terms "over" and "under" are thus used in relation to the two opposite sides of the cassette, one on a face and two on the other face, whether the cassette is horizontal or not.

By the swinging action of the upper guide, the plane of the cassette is shifted parallel to itself as the inferior or underlying guide is compelled to follow the translation of the cassette and keep the cassette restrained from swinging or canting movement. Side restraining means are provided and which prevent movement of the cassette in a direction transverse to the direction of translation or descent of the cassette.

An embodiment of the present invention is illustrated by way of example in the drawings in which.

Figure 1:
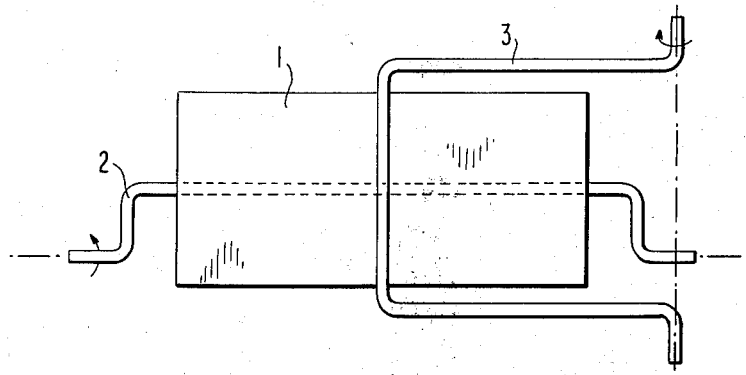
FIG. 1 is a diagrammatic illustration of the location and relative orientation of the guides for use in translating the cassette in accordance with the invention.

With reference to the drawing there is diagrammatically illustrated cassetta 1 plugged-or inserted in between two cross pieces 2 and 3 orthagonally related one to the other. Side elements which constrain and prevent cross movement or lateral movement of the cassette once the inserting movement is started are not shown. One of the cross-pieces, i.e. cross-piece 3, is driven elastically or biased against cross-piece 2. Therefore, the cassette is fully constrained from movement and has no freedom at all. As stated previously, cross-pieces 2 and 3 can each swing about its own axis, the axes being orthagonal or perpendicular one to the other as illustrated. If a pressure is applied to cross-piece 3 in the direction orthagonal or normal to the plane of cassette 1 and toward cross-piece 2, cross-piece 2 will be compelled to swing about its axis of rotation. Therefore, as cassette 1 cannot move transversely, the cassette will be translated parallel to itself in a direction normal to its plane.

Figure 2:
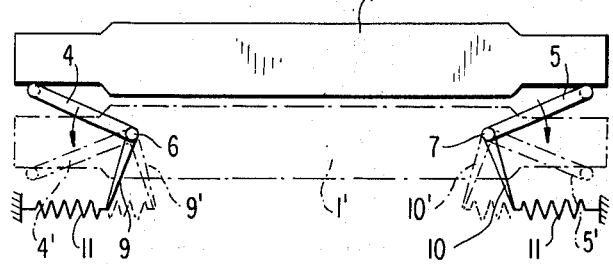
FIG. 2 is an end elevational view of a tape cassette translation device according to the present invention taken normal to the plane of the cassette and illustrating a preferred form of the present invention hereof.
Figure 3:
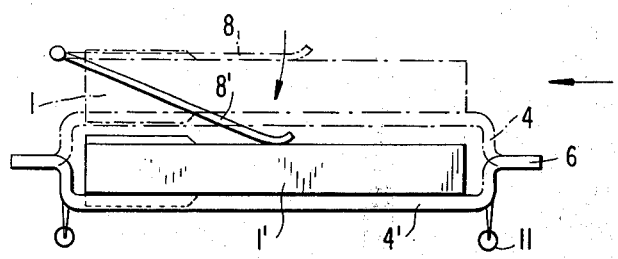
FIG. 3 is a side elevational view of the tape cassette translation device illustrated in FIG. 2.

In the preferred embodiment of the present invention illustrated in FIGS. 2 and 3, cross-pieces 4 and 5 are located on the underside of cassette 1. These two cross-pieces 4 and 5 rotate, as a consequence of a directly or indirectly applied force on the cassette having a component in the direction of cross-pieces 4 and 5, around their axes 6 and 7 toward and into the positions denoted 4' and 5' and by the dashed lines in FIG. 2. As a consequence 1 is translated parallel to itself and is displaced into the position denoted 1'. Of course, the superior cross-piece, not shown in the FIG. 2, and on the opposite side of the cassette 1 from crosspieces 2 and 3, follows. the swinging the movement of the cross-pieces 4 and 5 and holds the cassette parallel to itself.

In other words, the superior cross-piece, for example the cross-piece 8 of FIG. 3, is moved from the position depicted by the broken line in the FIG. 3 to the position 8' depicted by the solid line, in the FIG. 3.

As aformentioned, the inferior cross-pieces 4 and 5 move elastically. In a preferred embodiment, they are stressed or biased upwardly toward the superior cross-piece in such a way as to hold the cassette in a lifted or elevated position. The manner in which such stress or bias is obtained is diagrammatically depicted in FIGS. 2 and 3. Levers or cross-pieces 4 and 5 are provided with appendices 9 and 10, which, when cross-pieces 4 and 5 reach the positions 4' and 5', obtain positions designated 9' and 10'. Springs 11, under tension, are coupled to appendices 9 and 10 and bias appendices 9 and 10 and hence cross-pieces 4 and 5 toward the full line positions illustrated in FIG. 2. Of course, springs 11 are only indicative of a type of biasing means and it is possible to provide other elastic means for the same purpose.

Figure 4:
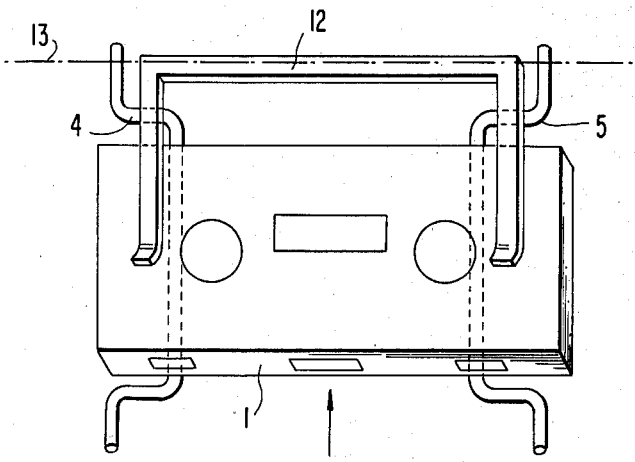
FIG. 4 is a perspective diagrammatical view of another embodiment of the present invention.

As already mentioned the upper cross-piece shown in previous FIGS. 1, 2 and 3 as a single element, can, on the contrary, comprise two or more elements corresponding to the cross-pieces 4 and 5 in their position under the plane, for example, as shown in FIG. 4. In FIG. 4, the upper cross-piece comprises a fork-like element 12 suitably pivotally supported on an axis 13 and therefore pivotal about this axis. This is their position under the plane, but, preferably, as shown in the FIG. 4. In this FIG. 4, the upper cross-piece is comprising a fork-element 12 pivotally supported on an axis 13 and therefore oscillating around this axis. This axis 13 is orthagonal or normal relative to the axes about which rotate cross-pieces 4 and 5. As a consequence of such fork-shape, the two prongs of the fork are applied on the cassette 1 and, as a result of the bias of the cross-pieces 4 and 5 in their position under the cassette, hold cassette 1 tightly between the aforementioned prongs and the cross-piece under the cassette. A pressure applied on the cassette, whether directly or, preferably through the fork 12, causes vertical translation of the cassette 1 similarly as illustrated in FIG. 2.

As consequence of this vertical translation of the cassette, the differenct elements carried by the recording and playback apparatus and to be received within the openings of the cassette will be accurately located enabling operation of the recorder and/or the playback apparatus.

As already mentioned, for the purpose of easing the insertion of the cassette within the holding device or cavity previously described and avoiding hindering such insertion, the edges of the cross-pieces in the direction of the insertion of the cassette are rounded off. This rounding off enables easy insertion and withdrawal of the cassette between the superior and inferior cross-pieces. Of course, the bias urging the inferior cross-pieces 4 and 5 or 2 is limited by convenient stops, not shown, in such a way that such inferior cross-pieces are prevented from obtaining an angle of 90° with single plane of cassetta 1 and; indeed, always obtain a smaller angle.

Accordingly, the foregoing constitutes a description of the basic principles and two embodiments of the improvements in recording and playback apparatus of the cassette type that are the objects of the present invention. Such improvements have been described in particular relation to the translation of cassettes in the tape recorders, that are using musicassette, and the need to reduce the sizes and configuration of, and particularly rendering flat and low, the recorder and/or playback apparatus. Of course, the same principles would be used for the application of the invention in other fields. However, the application of this invention is most suitable to the field of recorders and/or playback apparatus using cassettes.

I claim:

1. Apparatus for receiving and enabling translatory motion of a tape cassette in a tape recording and/or playback device comprising: means defining a cavity for receiving a tape cassette having a planar configuration, a first guide superposed over and engageable with the cassette when received within said cavity and pivotal about a first predetermined axis parallel to the plane of the cassette, a second guide underlying the cassette when received within said cavity and on the opposite side thereof from said first guide, said second guide being pivotal about a second predetermined axis parallel to the plane of the cassette and normal to said first axis, and means for biasing said second guide for movement in a direction toward said first guide to engage the cassette and maintain the latter between said first and second guides whereby the cassette is movable against the bias of said biasing means in a direction normal to the plane of the cassette.

2. Apparatus according to claim 1 wherein said biasing means includes a spring.

3. Apparatus according to claim 2 including means for preventing lateral movement of the cassette when inserted into said cavity.

4. Apparatus according to claim 1 wherein said biasing means includes a spring, a second guide including a pair of spaced guide elements each pivotal about a predetermined axis parallel to one another and the plane of the cassette and normal to said first axis, said guide elements having portions spaced from said second axis and being adapted to engage the cassette adjacent opposite ends, said pair of guide elements being pivotal in opposite directions.

5. Apparatus according to claim 1 wherein said second guide includes a pair of spaced guide elements each pivotal about a predetermined axis parallel to one another and the plane of the cassette and normal to said first axis, said guide elements having portions spaced from said second axis and being adapted to engage the cassette adjacent opposite ends thereof.

6. Apparatus according to claim 5 wherein said pair of guide elements are pivotal in opposite directions.

7. Apparatus according to claim 5 wherein said first guide includes a fork-like element with the individual prongs thereof adapted to engage the cassette adjacent its opposite ends.

8. Apparatus according to claim 5 wherein the edges of said pair of guide elements closest to the direction in which the cassette is inserted are rounded.

9. Apparatus according to claim 5 including means for limiting the rotation of said second guide to prevent said second guide portions from obtaining positions directly between the cassette and said second axis and in a plane normal to the plane of the cassette.

* * * * *